and States Patent

(12) United States Patent
Chandraghatgi et al.

(10) Patent No.: US 7,455,774 B2
(45) Date of Patent: Nov. 25, 2008

(54) AGENT AND METHOD FOR DECONTAMINATING SOIL, GROUNDWATER OR SEDIMENT CONTAMINATED WITH HEXAVALENT CHROMIUM

(75) Inventors: Shrihari Chandraghatgi, Toyama (JP); Shingo Maeda, Toyama (JP); Kaoru Nogawa, Toyama (JP); Hideki Himi, Toyama (JP)

(73) Assignee: Ecocycle Corporation, Toyama (JP)

( * ) Notice: Subject to any disclaimer, the term of this patent is extended or adjusted under 35 U.S.C. 154(b) by 91 days.

(21) Appl. No.: 10/573,201

(22) PCT Filed: Aug. 4, 2004

(86) PCT No.: PCT/JP2004/011139

§ 371 (c)(1),
(2), (4) Date: Mar. 24, 2006

(87) PCT Pub. No.: WO2005/028133

PCT Pub. Date: Mar. 31, 2005

(65) Prior Publication Data

US 2007/0051676 A1      Mar. 8, 2007

(30) Foreign Application Priority Data

Sep. 24, 2003      (JP)      ............... 2003-332352

(51) Int. Cl.
*C02F 3/00*      (2006.01)

(52) U.S. Cl. .................. 210/610; 435/262.5
(58) Field of Classification Search .......... 210/610; 435/267.5

See application file for complete search history.

(56) References Cited

U.S. PATENT DOCUMENTS 6,303,367 B1 * 10/2001 Kataoka et al. .......... 435/262.5

FOREIGN PATENT DOCUMENTS

| JP | 9-225449 | 9/1997 |
| JP | 2003-311258 | 11/2003 |

\* cited by examiner

*Primary Examiner*—Chester T. Barry
(74) *Attorney, Agent, or Firm*—Sughrue Mion, PLLC

(57) ABSTRACT

It is an objective of the present invention to provide a decontaminant capable of efficiently and rapidly decontaminating soil, groundwater or sediment contaminated with hexavalent chromium, and a decontamination method utilizing the same. By adding at least one of iron (0) and ferrous iron, and a microbial biostimulant of at least one member selected from the group consisting of yeast extract, inactive yeast, active yeast and peptone to soil, groundwater or sediment contaminated with hexavalent chromium. Hexavalent chromium is chemically and biologically reduced efficiently, and iron reducing microorganisms are propagated and activated to sustain reducing power of the added iron over a long period of time.

3 Claims, 5 Drawing Sheets

AGENT AND METHOD FOR DECONTAMINATING SOIL, GROUNDWATER OR SEDIMENT CONTAMINATED WITH HEXAVALENT CHROMIUM

TECHNICAL FIELD

The present invention relates to a decontaminant and a decontamination method for decontaminating soil, groundwater or sediment contaminated with hexavalent chromium.

BACKGROUND ART

Hexavalent chromium is used in many industrial fields such as electroplating, production of coating materials, tanning and the like. Wastes generated from such industries is liable to leak from a storage container or piping and percolate into underground. Hexavalent chromium is a substance acting on a human body as a powerful carcinogen and dissolves in water in the form of a chromate or a bichromate to contaminate groundwater or soil, causing a serious environmental problem.

As a technique for remediating soil or groundwater contaminated with hexavalent chromium, dig and dispose, solidification or immobilization, or containment is generally used. As an in-situ decontamination technique, there have been disclosed a method which comprises injection of an oxidizing agent such as a permanganate, ozone, hypochlorous acid, hydrogen peroxide or the like (see, for example, Patent Document 1), a method which comprises treating soil with an aqueous citric or tartaric acid solution to remove a hazardous heavy metal (see, for example, Patent Document 2), and phytoremediation, in which plants absorb and accumulate heavy metals to remove the contaminants from soil (see, for example, Patent Document 3).

Further, a technique which comprises reducing hexavalent chromium to trivalent chromium that is water-insoluble to effect decontamination is potential one because it is capable of decontaminating in situ and can be carried out at a low cost. In this method, when hexavalent chromium is once reduced to trivalent chromium (chromium (III) hydroxide), the resultant is filtered by soil particles and thereby removed from groundwater.

Various chemical substances and microbial biostimulants are used in reduction of hexavalent chromium in soil or groundwater. Of these, zerovalent iron (hereinafter referred to as iron (0)) is one of substances which are most highly effective in reducing hexavalent chromium to trivalent chromium and used in various applications in the field of hexavalent chromium-decontamination as a reducing agent.

In Patent Document 4, there is described a method which comprises forming a dispersed layer of powdery iron by applying iron powder into the ground to decontaminate groundwater passing therethrough. Patent Document 5 discloses a method which utilizes iron as a reducing agent in a permeable reactive barrier to reduce hexavalent chromium contained in groundwater passing through the reaction wall to trivalent chromium. In Patent Document 6, there is described a decontaminant containing iron which is mixed with a contaminated medium to reduce hexavalent chromium. Each of Patent Documents 7 and 8 discloses a method which comprises injecting ferrous sulfate into a contaminated medium or mixing ferrous sulfate with a contaminated medium to convert hexavalent chromium to trivalent chromium through chemical reduction reaction, thereby effecting decontamination.

When ferrous iron is used as a reducing agent, the following reactions occur between ferrous iron and hexavalent chromium. According to the following formula 2, 3 mols of ferrous iron are required to reduce 1 mol of hexavalent chromium.

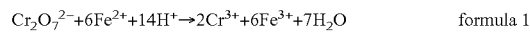
$$Cr_2O_7^{2-}+6Fe^{2+}+14H^+\rightarrow 2Cr^{3+}+6Fe^{3+}+7H_2O \qquad \text{formula 1}$$

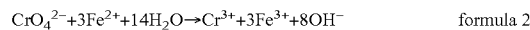
$$CrO_4^{2-}+3Fe^{2+}+14H_2O\rightarrow Cr^{3+}+3Fe^{3+}+8OH^- \qquad \text{formula 2}$$

In the nature, microorganisms capable of reducing hexavalent chromium in aerobic or anaerobic conditions exist (see, for example, Non-Patent Documents 1 and 2). Some of these microorganisms utilize hexavalent chromium as a terminal electron acceptor to obtain energy. As a heavy metal-decontamination technique utilizing such microorganisms, there is described a method which comprises supplying carbon and energy to indigenous hexavalent chromium reducing microorganisms by adding blackstrap molasses or cooking oil as a decontaminant to utilize biological reduction reaction in hexavalent chromium-decontamination in each of Patent Documents 9, 10 and 11.

Patent Document 1: Japanese Unexamined Patent Publication No. 2002-096057

Patent Document 2: Japanese Unexamined Patent Publication No. Hei 11-156338 (1999-156338)

Patent Document 3: Japanese Unexamined Patent Publication No. 2002-336837

Patent Document 4: Japanese Unexamined Patent Publication No. 2002-200478

Patent Document 5: U.S. Patent Application Publication No. 2001/0054588

Patent Document 6: Specification of U.S. Pat. No. 5,975,798

Patent Document 7: Japanese Unexamined Patent Publication No. 2001-121131

Patent Document 8: Japanese Unexamined Patent Publication No. 2000-202421

Patent Document 9: Specification of U.S. Pat. No. 6,143,177

Patent Document 10: Specification of U.S. Pat. No. 6,322,700

Patent Document 11: Specification of U.S. Pat. No. 6,398,960

Non-Patent Document 1: "Aerobic reduction of hexavalent chromium in soil by indigenous Microorganisms" (Bader et al.), Bioremediation Journal, 1999, No. 3, pp. 201-211

Non-Patent Document 2: "Factors affecting chromate reduction in *Enterobactor cloacae* strain H01" (Komori et al.), Applied Microbiology and Biotechnology, 1989, No. 31, pp. 567-570

DISCLOSURE OF INVENTION

Problems to be Solved by the Invention

When iron is used in hexavalent chromium-decontamination as a reducing agent, there is a problem that iron particles have their surfaces converted to ferric hydroxide and are thereby decreased in reactivity to lead to not long-lasting decontamination effect. Further, when contaminant concentration is high, addition of a large amount of iron is required to reduce hexavalent chromium. On the other hand, if an iron compound such as ferrous sulfate is added to groundwater in too large an amount, pH of the groundwater will decrease to inhibit reduction reaction, and consequently, trivalent chromium may oxidize to hexavalent chromium. In addition, if groundwater has high levels of dissolved oxygen, there is a problem that reaction rate of reduction of hexavalent chromium with ferrous iron is low.

On the other hand, the difficulty associated with the use of microbial biostimulant in hexavalent chromium remediation can be that when concentration of hexavalent chromium is extremely high and a few or no indigenous microorganisms capable of reducing hexavalent chromium exist, it is difficult to effect decontamination. Further, even in a case where concentration of hexavalent chromium is low, there is a problem that indigenous microorganisms take a period of time for adapting to surrounding environment utilizing the nutrients supplied and thereby start reducing hexavalent chromium, and accordingly, decontamination takes a long period of time.

The present invention has been made in view of the above-described circumstances. It is, therefore, an object of the present invention to provide a decontaminant capable of efficiently and rapidly decontaminating soil, groundwater or sediment contaminated with hexavalent chromium, and a decontamination method utilizing the same.

Means to Solve the Problems

An agent for decontaminating soil, groundwater or sediment contaminated with hexavalent chromium, according to the present invention, characteristically comprises at least one of iron (0) and ferrous iron, and a microbial biostimulant of at least one member selected from the group consisting of yeast extract, inactive yeast, active yeast and peptone.

A method for decontaminating soil, groundwater or sediment contaminated with hexavalent chromium, according to the present invention, characteristically comprises applying at least one of iron (0) and ferrous iron, and a microbial biostimulant of at least one member selected from the group consisting of yeast extract, inactive yeast, active yeast and peptone to soil, groundwater or sediment to thereby reduce hexavalent chromium to trivalent chromium.

According to the present invention, hexavalent chromium can be reduced through biological reductive action of the microorganism activating additive in parallel with the chemical reductive action of iron (0) and/or ferrous iron. This enables efficient and rapid hexavalent chromium-decontamination to be realized.

Yeast extract, inactive yeast, active yeast and peptone as constituents of the microbial biostimulant used in the agent and the method for decontaminating soil, groundwater or sediment contaminated with hexavalent chromium, according to the present invention, contain well-balanced nutrients which are essential for microorganisms to propagate such as nitrogen, phosphorous, inorganic substances, amino acids, vitamins and the like. Accordingly, these are effective as substances for propagating and activating hexavalent reducing microorganisms and iron reducing microorganisms or aerobic microorganisms and facultative anaerobic microorganisms.

Further, yeast extract, active yeast, inactive yeast, and peptone are effective as substances for promoting reduction of hexavalent chromium or iron because organic acids as decomposition products thereof act as electron donors in reduction of hexavalent chromium or iron.

When the decontaminant comprising at least one of iron (0) and ferrous iron and the microbial biostimulant is added to soil, groundwater or sediment contaminated with hexavalent chromium, hexavalent chromium is chemically reduced to trivalent chromium by reducing power of iron (0) and/or ferrous iron, and indigenous hexavalent chromium reducing microorganisms propagated and activated by the microbial biostimulant biologically reduce hexavalent chromium to trivalent chromium.

Moreover, indigenous iron reducing microorganisms propagated and activated by the microbial biostimulant reduce ferric iron formed by having been oxidized in reduction reaction of hexavalent chromium to ferrous iron, and the thus recovered ferrous iron can be used again as a hexavalent chromium reducing agent.

By virtue of this, ferrous iron can be used repeatedly as a reducing agent, and accordingly, reducing power of ferrous iron can be utilized for a long period of time. Further, amount of iron (0) or ferrous iron can be reduced.

Furthermore, until indigenous microorganisms are propagated and activated by the microbial biostimulant to adapt to surrounding environment, concentration of hexavalent chromium is lowered by reductive action of iron (0) and/or ferrous iron. Accordingly, reduction of hexavalent chromium is efficiently effected, and a work period required for decontamination can be reduced.

The present invention will be described with reference to schematic views shown in FIGS. 1 and 2.

FIG. 1 is a schematic view showing a case where a decontaminant comprising iron (0) and a microbial biostimulant is used. First, the iron added to soil, groundwater or sediment in a contaminated site reduces hexavlent chromium to hardly water-soluble trivalent chromium and the iron itself is converted to ferrous iron (a), and the ferrous iron in turn reduces hexavalent chromium and is converted to ferric iron (b).

On the other hand, in a stage where indigenous hexavalent chromium reducing microorganisms utilize hexavalent chromium as a terminal electron acceptor to thereby reduce hexavalent chromium to hardly water-soluble trivalent chromium (c), the microbial biostimulant added together with the iron functions as sources of carbon and energy supply (electron donor) to the hexavalent chromium reducing microorganisms to propagate and activate the hexavalent chromium reducing microorganisms (d).

Further, the microbial biostimulant also functions as sources of carbon and energy supply to indigenous iron reducing microorganisms in reduction reaction of ferric iron as a terminal electron acceptor to ferrous iron to propagate and activate the iron reducing microorganisms (e). The ferrous iron resulting from the reaction can be used again as a reducing agent in reduction of hexavalent chromium to trivalent chromium (f). In other words, the ferric iron formed at surfaces of the iron (0) particles in the above-described oxidation reaction is converted to ferrous iron by the reduction reaction, and the ferrous iron is dissolved in water. Accordingly, reductive effect of the added iron (0) and/or ferrous iron lasts for a considerably long period of time.

FIG. 2 is a schematic view of a case where a decontaminant comprising ferrous iron and a microbial biostimulant is used. The ferrous iron reduces hexavalent chromium to hardly water-soluble trivalent chromium and the ferrous iron itself is converted to ferric iron (a).

On the other hand, in a stage where indigenous hexavalent chromium reducing microorganisms utilize hexavalent chromium as a terminal electron acceptor to thereby reduce hexavalent chromium to hardly water-soluble trivalent chromium (b), the microbial biostimulant added together with the iron functions as sources of carbon and energy supply (electron donor) to the hexavalent chromium reducing microorganisms to propagate and activate the hexavalent chromium reducing microorganisms (c).

Further, indigenous iron reducing microorganisms are propagated and activated by the microbial biostimulant (d), and utilize ferric iron as a terminal electron acceptor to reduce the ferric iron to ferrous iron (e). The ferrous iron resulting from the reduction reaction can be used again as a hexavalent chromium reducing agent, and exhibits its effect as a reducing agent over a long period of time.

As described above, in decontamination of soil, groundwater or sediment contaminated with hexavalent chromium, it is possible to reduce hexavalent chromium chemically and biologically with increased efficiency by adding, to the medium to be decontaminated, at least one of iron (0) and ferrous iron and a microbial biostimulant of at least one member selected from the group consisting of yeast extract, inactive yeast, active yeast and peptone. It is further possible to sustain reducing power of the added iron over a prolonged period of time by propagating and activating iron reducing microorganisms with yeast extract, inactive yeast, active yeast, and/or peptone as the microbial biostimulant.

Further, yeast extract, inactive yeast, active yeast, and/or peptone as constituents of the microbial biostimulant function as nutrition and energy sources for aerobic microorganisms to consume oxygen to thereby create an anaerobic atmosphere. Accordingly, oxygen level in soil, groundwater or sediment is lowered, and the reduction reaction of hexavalent chromium by means of iron (0) and/or ferrous iron can be promoted.

Effect of the Invention

According to the present invention, soil, groundwater or sediment contaminated with hexavalent chromium can be decontaminated efficiently and rapidly. Further, iron can be used in a reduced amount to thereby enable low cost decontamination to be realized.

BEST MODE FOR CARRYING OUT THE INVENTION

In the following, embodiments of the present invention will be described.

In the present invention, the substance which is the object to be removed is hexavalent chromium. Iron (0) and/or ferrous iron added in a contaminated site chemically reduce hexavalent chromium to hardly water-soluble trivalent chromium, and the trivalent chromium is filtered by soil particles and removed from groundwater flow.

A microbial biostimulant functions as nutrition and energy sources for aerobic microorganisms to consume oxygen to thereby create an anaerobic condition, and also function as sources of nutrition and energy (electron donor) for hexavalent chromium reducing microorganisms to utilize hexavalent chromium as a terminal electron acceptor under facultatively anaerobic condition to biologically reduce the hexavalent chromium to trivalent chromium. Further, the microbial biostimulant also functions as sources of nutrition and energy (electron donor) for iron reducing microorganisms to utilize, as a terminal electron acceptor, ferric iron resulting from oxidation of ferrous iron in the chemical reduction reaction of hexavlent chromium to reduce the ferric iron to ferrous iron, thereby recovering the ferrous iron.

In this embodiment, appropriate type and proportion of the microbial biostimulant are determined in a microcosm experiment in a laboratory according to microbial community indigenous to a contaminated site. Microcosms are created using soil and groundwater which have been collected from the contaminated site. At least one of iron (0) and ferrous iron and a microbial biostimulant are mixed in various proportions, followed by sterilization. Then, each of the preparations is added to one of the microcosms. The microcosms are kept at a predetermined temperature to cultivate the microorganisms. In aseptic and anaerobic conditions, the soils and waters are periodically sampled to analyze hexavalent chromium, total chromium, iron compounds, total organic carbon (TOC) and the like in accordance with the official methods. Hexavalent chromium and total chromium are analyzed to confirm decontamination effect, and iron compounds and TOC are analyzed to confirm whether or not iron (0) and ferrous iron as reducing agents, ferric iron resulting from oxidation thereof, and the microbial biostimulant which is an organic compound or organic compounds remain. Based on the results of the experiment for a predetermined period of time, generally a period of 1 to 2 months, the optimum constituents of the decontaminant and proportions thereof for the contaminated site are determined.

Thereafter, actually at the contaminated site, the decontaminant of which constituents and proportions thereof have been determined in the experiment is added to soil, groundwater and sediment. Form of the decontaminant may be a solid form, liquid form, slurry form or the like, and the form is determined based on results of research on geological conditions such as geological formations in the contaminated site and state of contamination in the contaminated site. As a method for adding the decontaminant, there may be mentioned a method which comprises dissolving the decontaminant in water to form a solution or dispersing the decontaminant in water to form a slurry, and injection of the decontaminant by gravity or pressure-injection using power of equipment such as a pump. The optimum method is selected according to geological conditions such as geological formations in the contaminated site and state of contamination in the contaminated site.

After the applying of the decontaminant, the soil, groundwater and sediment are sampled every predetermined period to analyze hexavalent chromium, total chromium, iron compounds, and TOC. Hexavalent chromium and total chromium are analyzed to confirm decontamination effect, and iron compounds and TOC are analyzed to confirm whether or not the decontaminant is sufficiently present throughout the area to be decontaminated.

For example, if iron compounds and/or TOC is decreased although hexavalent chromium remains at an observation point, the iron compounds and/or the microbial biostimulant are insufficient at the point due to biodegradation and/or dilution by groundwater flow. There is a possibility that hexavalent chromium concentration is again increased in the area to be decontaminated by solution of hexavalent chromium from the soil, and accordingly, it is necessary to inject again the decontaminant.

In the following, Examples of the present invention will be given to specifically describe the invention in further detail. In this connection, it should be noted that the present invention is by no means restricted to the following Examples.

EXAMPLE 1

Example is given below in which groundwater contaminated with hexavalent chromium was decontaminated using decontaminants comprising iron (0) and a microbial biostimulant in combination on a laboratory scale.

From a site contaminated with hexavalent chromium, groundwater and soil were collected. The samples were placed in 1 liter glass containers and transported to the laboratory under refrigerated conditions. 50 g of the soil and 100 ml of the groundwater were dispensed to each of 200 ml glass containers under aseptic condition. Various microbial biostimulants shown in Table given below were added in the respective containers to prepare experimental samples.

The decontaminants shown in Table 1 were sterilized and then added in the respective containers to initiate cultivation of the samples. In this connection, in each case of Samples Nos. 6 to 9 to which iron (0) and a microbial biostimulant were added, iron (0) was first added thereto and mixed well. 3 weeks later, the microbial biostimulant was added. Ten samples were cultivated, and 0, 14, 28, 42, 56, 70 and 84 days after initiation of the cultivation, 3 analytes were taken from the water of each of the samples, i.e., 30 analytes were taken in total to analyze concentrations of hexavalent chromium contained in the analytes in accordance with the official method for analyzing hexavalent chromium in groundwater in Japan (JIS K0102 65.2). In FIG. 3, there are shown changes of concentration of hexavalent chromium with days in each of the samples based on the average of those in the 3 analytes.

As shown in FIG. 3, the concentrations of hexavalent chromium in the decontaminant-added samples were low as compared with that in the sample to which no decontaminant was added (Sample No. 10). In the samples to which only lactose, yeast extract, calcium propionate, or peptone was added, the concentrations of hexavalent chromium could not be reduced to 150 mg/l or lower. As the reason for this, it is considered that initial concentrations of hexavalent chromium were undesirably high for the indigenous microorganisms, and hexavalent chromium acts on the microorganisms as a toxic substance to retard decomposition thereof.

If the concentration of hexavalent chromium is high, it takes a long time for the indigenous microorganisms to adapt to the environment. In the sample to which only powdery iron (0) was added (Sample No. 1), decrease of the hexavalent chromium concentration at the initial stage was rapid. However, rate of the decrease lowered with time. Even after 84 days from the initiation of the cultivation, the sample could not be decontaminated to such an extent that the hexavalent chromium concentration was reduced to the environmental standard for groundwater (0.05 mg/l). As the reason for this, it is considered that the added powdery iron (0) was oxidized through reaction with hexavalent chromium and lost its reactivity.

In the samples to which iron (0) and the microbial biostimulant were added (Sample Nos. 6 to 9), concentrations of hexavalent chromium were lowered to the environmental standard or lower in 5 weeks. Of these, the sample to which yeast extract or peptone was added together with iron (0) (Sample No. 8 or 9) had greatest effect of lowering hexavlent chromium concentration. The result is attributable to the fact that hexavalent chromium was chemically reduced with iron (0) and thereby reduced in quantity at the initial stage, and further, while the chemical reduction progressed, hexavalent chromium reducing microorganisms were activated by the microbial biostimulant to adapt the surrounding environment, and hexavalent chromium was biologically reduced by the hexavalent chromium reducing microorganisms.

When comparisons are made between the samples to which iron (0) and the microbial biostimulant were added in combination and the samples to which the microbial biostimulant was added alone (comparisons between Sample Nos. 2 and 6, Sample Nos. 3 and 7, Sample Nos. 4 and 8, and Sample Nos. 5 and 9), it is found that in the samples to which iron (0) and the microbial biostimulant were added in combination, decontamination effects lasted over a longer period of time. The above results show that use of iron (0) and the microbial biostimulant in combination enables hexavalent chromium to be reduced efficiently.

Table 1: Iron (0) and Microbial Biostimulant which were used in the Experiment

TABLE 1

| SAMPLE NO. | DECONTAMINANT AMOUNT OF ADDITION PER CONTAINER |
|---|---|
| 1 | IRON(O) 0.5 g |
| 2 | LACTOSE 1.0 g |
| 3 | CALCIUM PROPIONATE 1.0 g |
| 4 | YEAST EXTRACT 1.0 g |
| 5 | PEPTONE 1.0 g |
| 6 | IRON(O) 0.5 g + LACTOSE 1.0 g |
| 7 | IRON(O) 0.5 g + CALCIUM PROPIONATE 1.0 g |
| 8 | IRON(O) 0.5 g + YEAST EXTRACT 1.0 g |
| 9 | IRON(O) 0.5 g + PEPTONE 1.0 g |
| 10 | CONTROL (NO DECONTAMINANT WAS ADDED) |

EXAMPLE 2

Example is given below in which groundwater contaminated with hexavalent chromium was decontaminated using decontaminants comprising a ferrous iron compound a microbial biostimulant in combination on a laboratory scale.

From a site contaminated with hexavalent chromium, groundwater and soil were collected. The samples were transported to the laboratory while being refrigerated in 1 liter bottles without head spaces. 50 g of the soil and 100 ml of the groundwater were dispensed to each of 200 ml glass containers under aseptic condition. After sterilization, substances shown in Table 2 given below were added in the containers as decontaminants.

11 samples in total were prepared and cultivated. 0, 14, 28, 42, 56, 70 and 84 days after initiation of the cultivation, 3 analytes were taken from the water of each of the samples, i.e., 33 analytes were taken in total to analyze concentrations of hexavalent chromium in accordance with the official method for analyzing hexavalent chromium in groundwater in Japan (JIS K0102 65.2). In FIG. 4, there are shown changes of concentration of hexavalent chromium with days in each of the samples based on the average of those in the 3 analytes.

In comparison with the control (Sample No. 11) to which no decontaminant was added, any of the decontaminant-added samples exhibited hexavalent chromium removing effect. In the samples to which only the microbial biostimulant was added (Sample Nos. 3 to 6), although concentrations of hexavalent chromium showed tendencies to decrease, hexavalent chromium could not be reduced under the environmental standard (0.05 mg/l) by the cultivation for 84 days. This shows that a long time is required to decontaminate hexavalent chromium contamination by means of addition of only the microbial biostimulant.

In the sample to which only ferrous iron was added (Sample No. 1), decrease rate of hexavalent chromium at the initial stage was rapid. However, when ferrous iron and the microbial biostimulant were added to the samples in combination (Sample Nos. 7 to 10), further improved effects were obtained. In the sample to which ferrous iron only was added in a small amount (one-sixth of that in Sample No. 1) (Sample No. 2), hexavalent chromium could not reduced to the environmental standard or less. This shows that theoretically, 3 mols of ferrous iron are required to reduce 1 mol of hexavalent chromium, and accordingly, 50 mg of ferrous iron was insufficient to reduce hexavalent chromium in this experiment.

On the other hand, in each of the samples to which ferrous iron and the microbial biostimulant of the invention were added in combination (Sample Nos. 7 to 10), 50 mg of ferrous chloride exhibited sufficient effect. The above results show that the addition of ferrous iron and the microbial biostimulant in combination enables hexavalent chromium to be efficiently reduced.

It should be noted that ferrous chloride was used in this Example, however, substantially the same effect is obtained by the use of ferrous sulfate. Further, when active yeast or yeast extract is used instead of inactive yeast or peptone, substantially the same effect is obtainable.

Table 2: Ferrous Iron and Microbial Biostimulant which were used in the Experiment

TABLE 2

| SAMPLE NO. | DECONTAMINANT AMOUNT OF ADDITION PER CONTAINER |
|---|---|
| 1 | FERROUS CHLORIDE 0.3 g |
| 2 | FERROUS CHLORIDE 0.05 g |
| 3 | SUCROSE 0.3 g |
| 4 | CALCIUM PROPIONATE 0.3 g |
| 5 | INACTIVE DRIED YEAST 0.3 g |
| 6 | PEPTONE 0.3 |
| 7 | FERROUS CHLORIDE 0.05 g + SUCROSE 0.15 g |
| 8 | FERROUS CHLORIDE 0.05 g + CALCIUM PROPIONATE 0.15 g |
| 9 | FERROUS CHLORIDE 0.05 g + INACTIVE DRIED YEAST 0.15 g |
| 10 | FERROUS CHLORIDE 0.05 g + PEPTONE 0.15 g |
| 11 | CONTROL (NO DECONTAMINANT WAS ADDED) |

EXAMPLE 3

A pilot remediation test was carried out using a ferrous iron compound and a microbial biostimulant at a site where soil and groundwater were contaminated with hexavalent chromium.

First, at the site, a soil core was collected by boring, and at the same time, an injection well was constructed. The soil sample was transported to the laboratory, and hexavalent chromium was analyzed in accordance with the official method (JIS K0102 65.2). 20 kg of yeast extract and 1 kg of ferrous sulfate were mixed with 15 ton of water, and the mixture was injected by gravity from the well into the groundwater. Soil and groundwater were collected from the vicinity of the injection well and from the injection well, respectively, and hexavalent chromium was analyzed and microbial counts of hexavalent chromium reducing microorganisms and iron reducing microorganisms were calculated. A method for calculating a microbial count will be described below.

To calculate microbial counts, 10 ml of the collected groundwater is diluted using 90 ml of a liquid culture medium by serial dilution to $10^{-8}$ concentration. The liquid culture medium contains nutritional substances for iron reducing microorganisms (see Applied and Environmental Microbiology, vol.68, Advance - - -, pp. 4629-4636, by Nielsen et al. in 2002) or for hexavalent chromium reducing microorganisms (see Bioremediation Journal, vol.6, "Effect of Carbon and Energy Source on Chromate Reduction", pp. 205-215, by Smith et al. in 2002). The diluted groundwater is placed in a vial bottle, and after hermetically sealing the vial bottle, cultivated at 30° C. for 10 days. After the cultivation, a sample of the groundwater is taken from the vial bottle, and hexavalent chromium and total chromium are analyzed in accordance with the official method (JIS K0102 65.2). A value obtained by subtracting the concentration of hexavalent chromium from the concentration of total chromium is considered as a concentration of trivalent chromium. If trivalent chromium is present in a sample, the sample is considered to contain hexavalent chromium reducing microorganisms. A microbial count of the hexavalent chromium reducing microorganisms is calculated in accordance with MPN (Most Probable Number) method (see USFDA, 2001, Bacteriological analytical manual on-line Journal, http://vm.cfsan.fda.gov/--ebam/bam-a2.html). A microbial count of the iron reducing microorganisms is calculated in accordance with MPN method (see Applied and Environmental Microbiology, vol.68, Advance - - -, pp. 4629-4636, by Nielsen et al. in 2002).

Results of the analysis of hexavalent chromium concentration in the groundwater and results of the analysis of hexavalent chromium concentration in the soil are shown in FIG. 5 and in FIG. 6, respectively. It is seen therefrom that by the addition of the decontaminant, each of the hexavalent chromium concentrations in the groundwater and in the soil decreased. In the case of the groundwater 28 days after the injection, the hexavalent chromium concentration was reduced to the minimum limit of determination (0.005 mg/l) or lower, as shown in FIG. 5. In the case of the soil 49 days after the injection, the hexavalent chromium concentration was reduced to 0.01 mg/l or lower, as shown in FIG. 6.

Changes in microbial counts of the reductive microorganisms in the groundwater after the addition of the decontaminant containing yeast extract are shown in Table 3. It is seen from Table 3 that by the injection of the microbial biostimulant and ferrous iron, both of the hexavalent chromium reducing microorganisms and the iron reducing microorganisms increased through an induction period at the initial stage. It is thereby understood that the microbial biostimulant promotes propagation of the microorganisms which contribute to decontamination of the soil and groundwater contaminated with hexavalent chromium. The iron reducing microorganisms entered death phase 28 days after the injection, and the hexavalent chromium reducing microorganisms began to decrease 42 days after the injection. This is attributable to the fact that the microbial biostimulant was decomposed and thereby decreased and that ferric iron and hexavalent chromium were utilized as terminal electron acceptors and thereby decreased.

When peptone was used instead of the yeast extract used in this Example, substantially the same results were obtained. Changes in microbial counts in the groundwater after addition of a decontaminant using peptone are shown in Table 4.

Table 3: Changes in Microbial Counts After the Injection of the Decontaminant Containing Yeast Extract

TABLE 3

| | DAYS AFTER INJECTION | | | | | | | |
|---|---|---|---|---|---|---|---|---|
| | 0 | 7 | 14 | 21 | 28 | 35 | 42 | 49 |
| MICROBIAL COUNT OF IRM* [MPN/ml] | $8.2 \times 10$ | $3.5 \times 10^3$ | $1.9 \times 10^6$ | $8.0 \times 10^6$ | $9.0 \times 10^3$ | $9.0 \times 10^2$ | $1.2 \times 10^2$ | $9.0 \times 10^1$ |

TABLE 3-continued

| | \multicolumn{8}{c}{DAYS AFTER INJECTION} | | | | | | | |
|---|---|---|---|---|---|---|---|---|
| | 0 | 7 | 14 | 21 | 28 | 35 | 42 | 49 |
| MICROBIAL COUNT OF HCRM** [MPN/ml] | $4.3 \times 10$ | $3.0 \times 10^2$ | $2.9 \times 10^3$ | $7.0 \times 10^5$ | $8.7 \times 10^5$ | $5.5 \times 10^6$ | $2.9 \times 10^3$ | $1.2 \times 10^3$ |

*IRM: IRON REDUCING MICROORGANISMS
**HCRM: HEXAVALENT CHROMIUM REDUCING MICROORGANISMS

Table 4: Changes in Microbial Counts After the Injection of the Decontaminant Containing Peptone

TABLE 4

| | \multicolumn{8}{c}{DAYS AFTER INJECTION} | | | | | | | |
|---|---|---|---|---|---|---|---|---|
| | 0 | 7 | 14 | 21 | 28 | 35 | 42 | 49 |
| MICROBIAL COUNT OF IRM* [MPN/ml] | $6.3 \times 10$ | $1.45 \times 10^5$ | $1.1 \times 10^7$ | $8.2 \times 10^3$ | $2.2 \times 10^3$ | $2.3 \times 10^2$ | $1.2 \times 10^2$ | $2.5 \times 10$ |
| MICROBIAL COUNT OF HCRM** [MPN/ml] | $3.4 \times 10$ | $4.6 \times 10$ | $6.9 \times 10^3$ | $1.3 \times 10^6$ | $6.8 \times 10^6$ | $7.2 \times 10^3$ | $2.6 \times 10^3$ | $1.2 \times 10^3$ |

*IRM: IRON REDUCING MICROORGANISMS
**HCRM: HEXAVALENT CHROMIUM REDUCING MICROORGANISMS

INDUSTRIAL APPLICABILITY

The decontaminant according to the present invention can advantageously be utilized in work of decontamination of soil, groundwater or sediment contaminated with hexavalent chromium.

Figure 1:
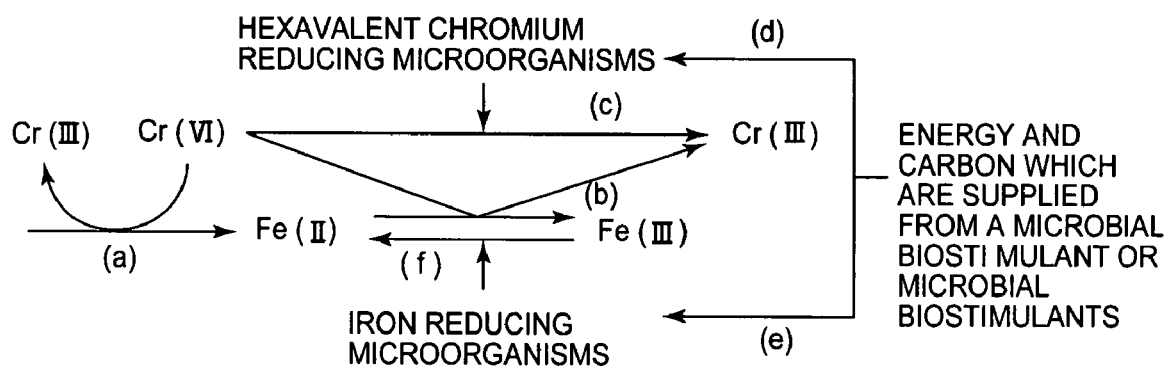
FIG. 1 is a schematic view showing a hexavalent chromium reducing system utilizing iron (0) and a microbial biostimulant.
Figure 2:
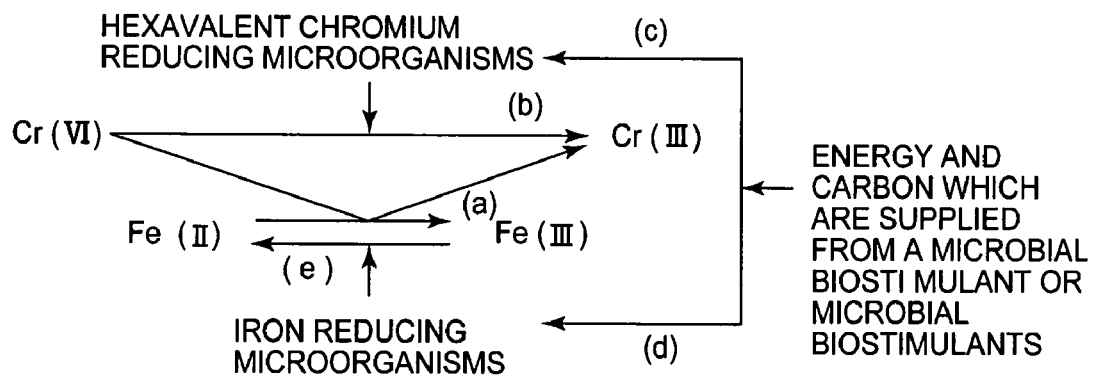
FIG. 2 is a schematic view showing a hexavalent chromium reducing system utilizing ferrous iron and a microbial biostimulant.
Figure 3:
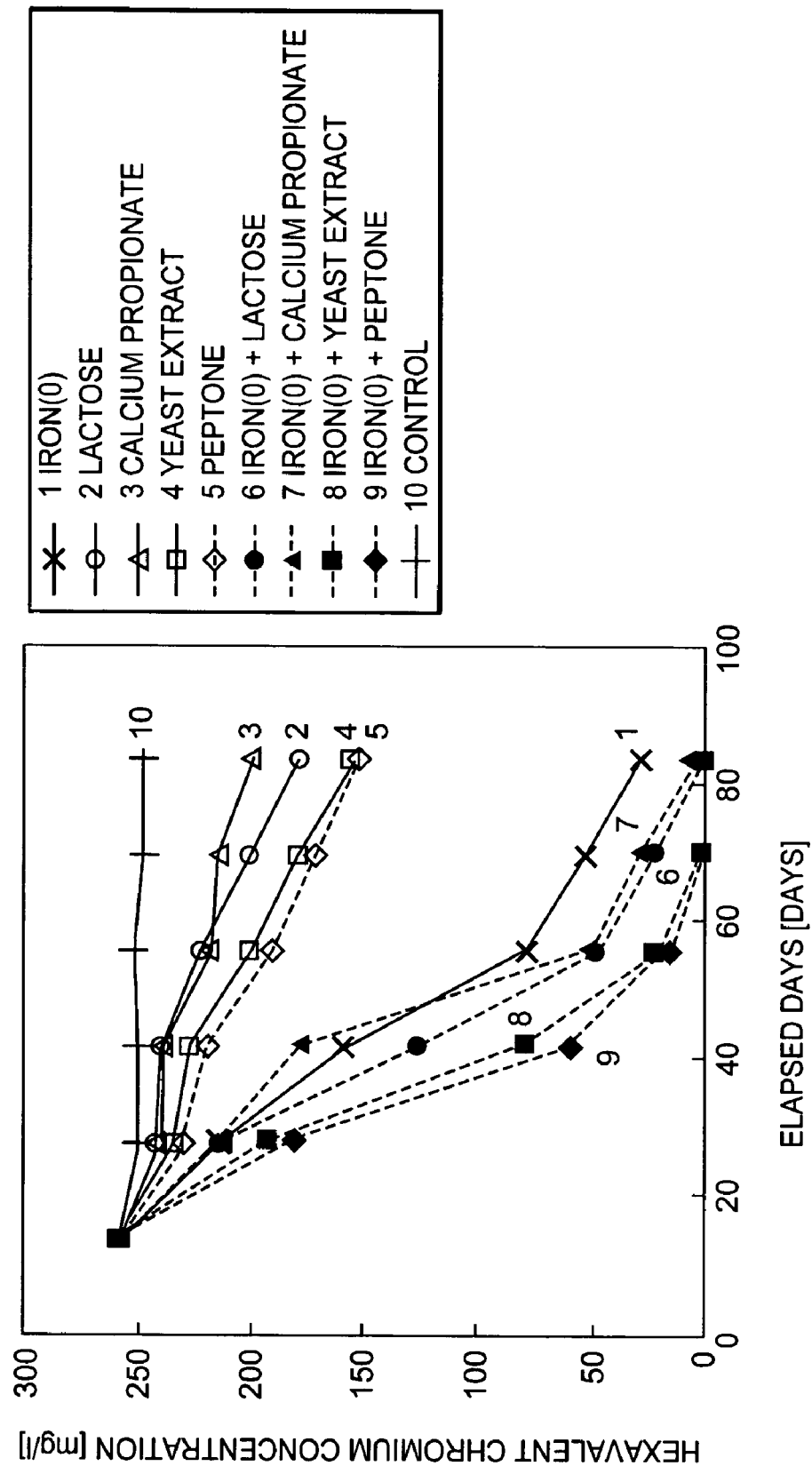
FIG. 3 is a graphical representation showing hexavalent chromium removal effects of various decontaminants containing iron (0) in a microcosm experiment.
Figure 4:
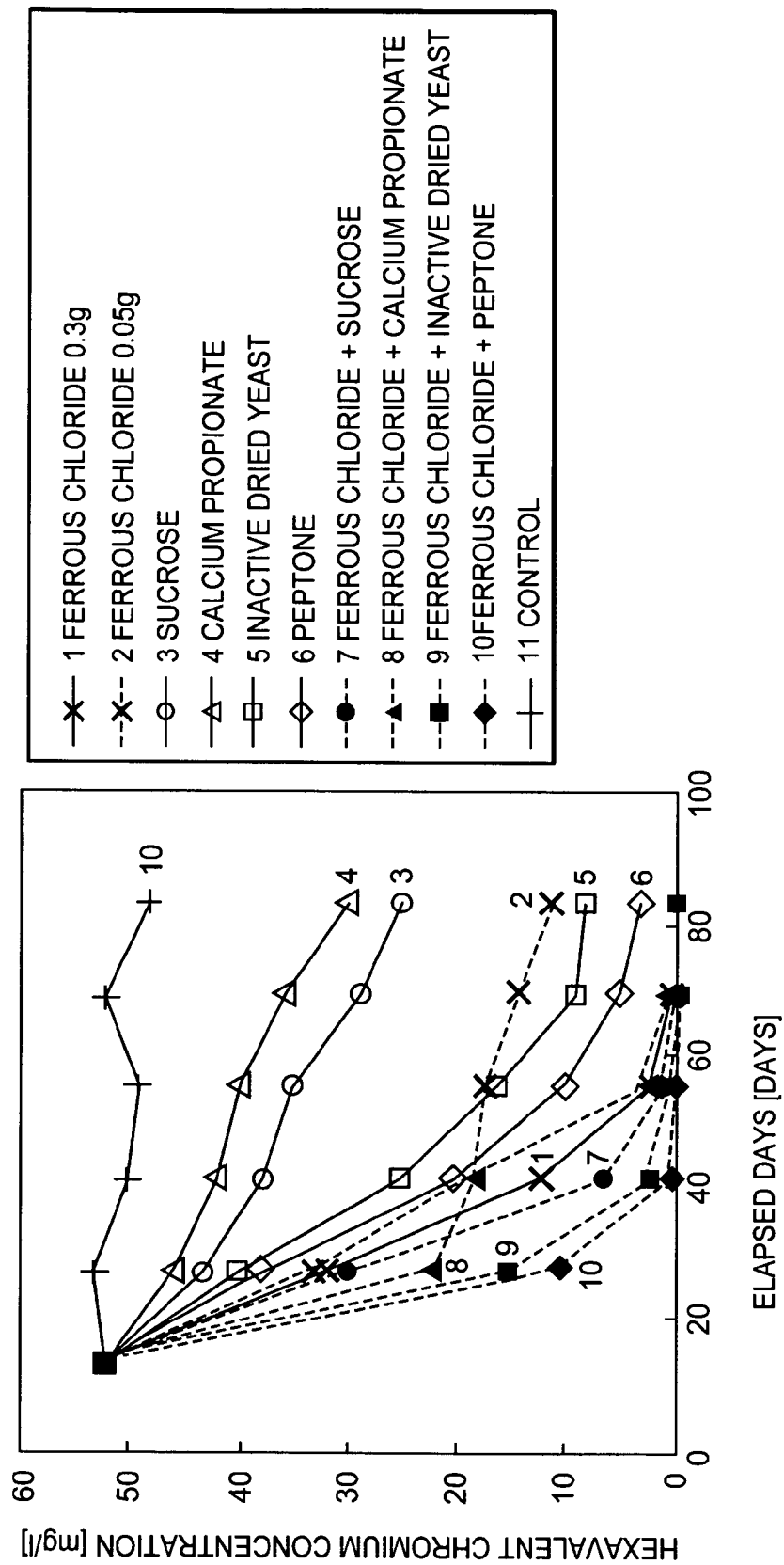
FIG. 4 is a graphical representation showing hexavalent chromium removal effects of various decontaminants containing a ferrous iron compound in a microcosm experiment.
Figure 5:
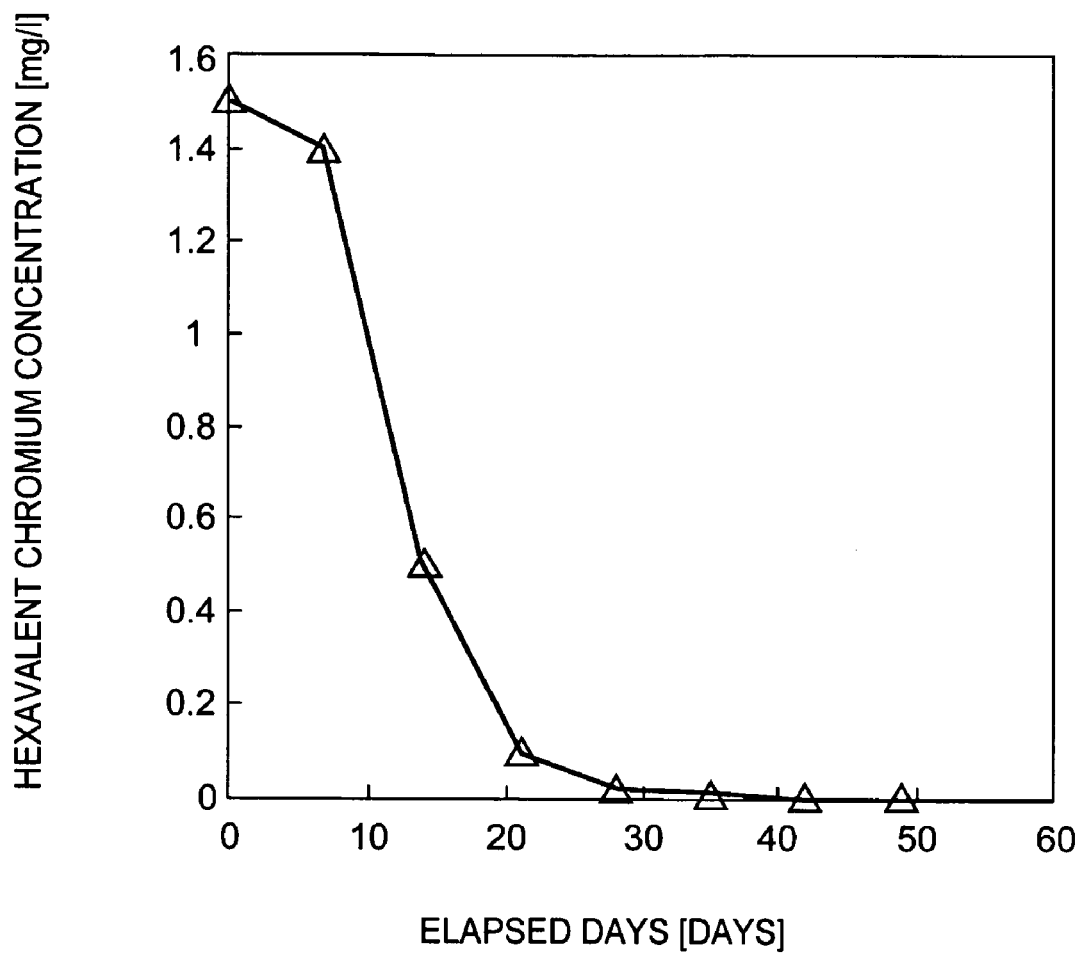
FIG. 5 is a graphical representation showing reduction of hexavalent chromium concentration in groundwater by injection of a decontaminant.
Figure 6:
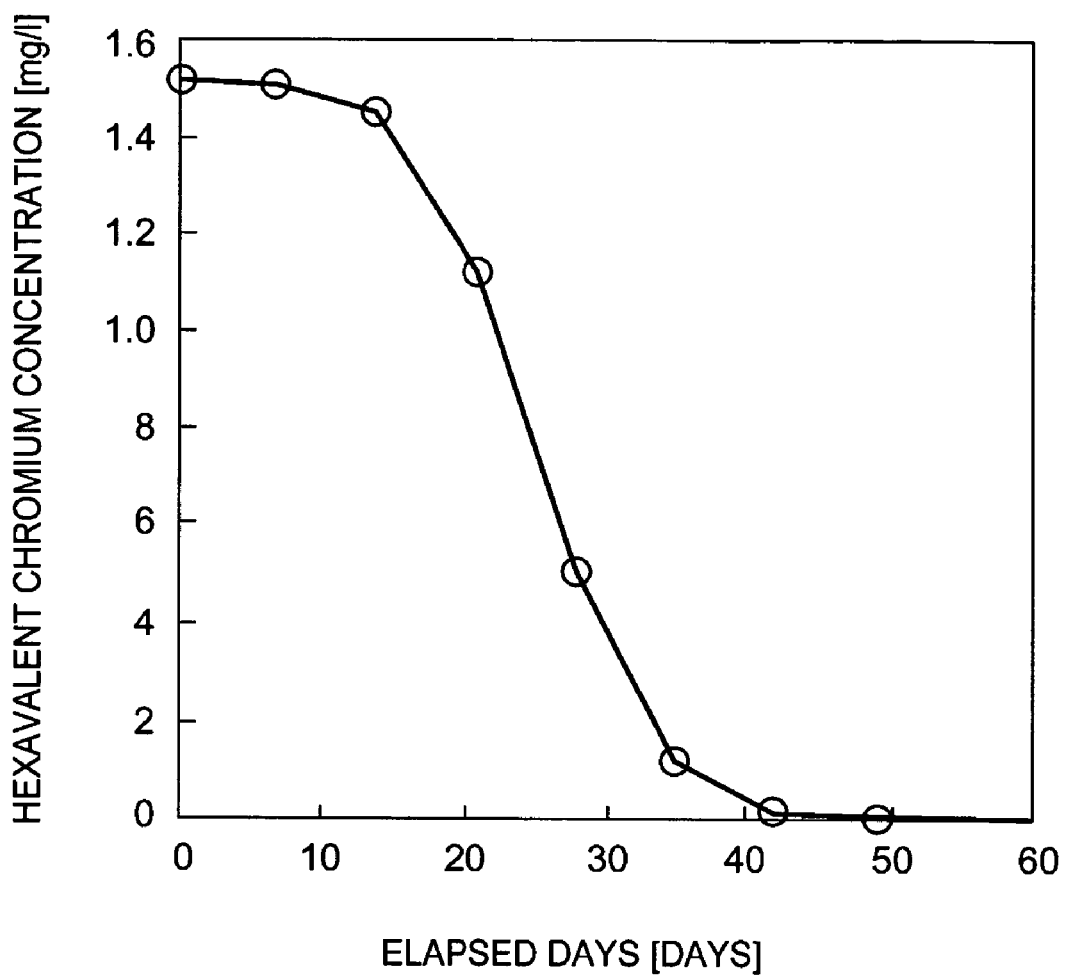
FIG. 6 is a graphical representation showing reduction of hexavalent chromium concentration in soil by injection of a decontaminant.

The invention claimed is:

1. An agent for decontaminating soil, groundwater or sediment contaminated with hexavalent chromium, said decontaminating agent comprising:
    ferrous iron in a hexavalent chromium decontaminating effective amount; and
    a microbial biostimulant of at least one member selected from the group consisting of yeast extract, inactive yeast, active yeast and peptone in an amount effective for propagation and activation of indigenous hexavalent chromium reducing microorganisms and indigenous iron reducing microorganisms,
    said agent acting in cooperation with indigenous hexavalent chromium reducing microorganisms present in said contaminated soil, groundwater or sediment to chemically and biologically reduce hexavalent chromium to trivalent chromium, and
    said agent acting in cooperation with indigenous iron reducing microorganisms present in said contaminated soil, groundwater or sediment to regenerate ferrous iron oxidized by chemical reduction of said hexavalent chromium.

2. A method for decontaminating soil, groundwater or sediment contaminated with hexavalent chromium, said method comprising:
    adding a decontaminating agent comprising at least one of iron (0) and ferrous iron in a hexavalent chromium decontaminating effective amount, and a microbial biostimulant of at least one member selected from the group consisting of yeast extract, inactive yeast, active yeast and peptone to said contaminated soil, groundwater or sediment in an amount effective for propagation and activation of indigenous hexavalent chromium reducing microorganisms and iron reducing microorganisms, to thereby reduce hexavalent chromium to trivalent chromium
    said agent acting in cooperation with indigenous hexavalent chromium reducing microorganisms present in said contaminated soil, groundwater or sediment to chemically and biologically reduce hexavalent chromium to trivalent chromium, and said agent acting in cooperation with indigenous iron reducing microorganisms present in said contaminated soil, groundwater or sediment to regenerate ferrous iron oxidized by chemical reduction of said hexavalent chromium.

3. The method of claim 2, wherein said decontaminating agent comprises ferrous iron in a hexavalent chromium decontaminating effective amount.

* * * * *